(12) United States Patent
Mondal et al.

(10) Patent No.: US 10,958,342 B1
(45) Date of Patent: Mar. 23, 2021

(54) METHOD AND SYSTEM FOR MANAGING INTERFERENCE CAUSED BY ROGUE NODE IN OPTICAL CAMERA COMMUNICATION NETWORK

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/835,468

(22) Filed: Mar. 31, 2020

(30) Foreign Application Priority Data

Mar. 23, 2020 (IN) .............................. 202041012639

(51) Int. Cl.
| | | |
|---|---|---|
| *H04B 10/116* | (2013.01) | |
| *H04B 10/114* | (2013.01) | |
| *H04N 7/22* | (2006.01) | |
| *H04L 5/00* | (2006.01) | |
| *H04B 10/40* | (2013.01) | |

(52) U.S. Cl.
CPC ....... *H04B 10/116* (2013.01); *H04B 10/1143* (2013.01); *H04B 10/40* (2013.01); *H04L 5/0057* (2013.01); *H04N 7/22* (2013.01)

(58) Field of Classification Search
CPC .. H04B 10/116; H04B 10/1143; H04B 10/40; H04L 5/0057; H04N 7/22
See application file for complete search history.

(56) References Cited

U.S. PATENT DOCUMENTS

| | | |
|---|---|---|
| 7,453,840 B1 | 11/2008 | Dietrlch et al. |
| 7,962,958 B2 | 6/2011 | Robert et al. |
| 9,137,670 B2 | 9/2015 | Gray et al. |
| 2010/0124421 A1* | 5/2010 | Chand ................ H04B 10/2587 398/140 |
| 2012/0157159 A1* | 6/2012 | Jang ..................... H04B 10/116 455/556.1 |
| 2018/0159624 A1* | 6/2018 | Jang ..................... H04N 5/3532 |
| 2019/0050697 A1* | 2/2019 | Meng ............... G06K 19/07749 |
| 2020/0222146 A1* | 7/2020 | Komp ................. A61B 1/3132 |

* cited by examiner

*Primary Examiner* — Mina M Shalaby
(74) *Attorney, Agent, or Firm* — Finnegan, Henderson, Farabow, Garrett & Dunner, LLP

(57) ABSTRACT

A method and system for identifying and mitigating interference caused by a rogue transmission source in an Optical Camera Communication (OCC) network is disclosed. The method includes receiving information from a plurality of transmission sources. Each of the plurality of transmission sources is within a capture area of a camera. Each of the plurality of transmission sources comprises a set of light sources configured to display one of a plurality of color codes. The method further includes detecting, through the camera, an interference between a serving transmission source associated with the camera and a non-serving transmission source. The serving transmission source belongs to the plurality of transmission sources. The method further includes establishing the non-serving transmission source as the rogue transmission source, when the non-serving transmission source is not registered with a master coordinator within the OCC network.

20 Claims, 5 Drawing Sheets

METHOD AND SYSTEM FOR MANAGING INTERFERENCE CAUSED BY ROGUE NODE IN OPTICAL CAMERA COMMUNICATION NETWORK

TECHNICAL FIELD

This disclosure relates generally to Optical Camera Communication (OCC) networks, and more particularly to a method and system for managing interference caused by rogue node in optical camera communication network.

BACKGROUND

The demand for wireless data communication is increasing at a very high rate. To keep up with this growing demand, the available Radio Frequency (RF) spectrum of below 10 GHz may not be sufficient. As an alternative, Optical Wireless Communication (OWC) involves communication over a light channel by a transmit-receive (transceiver) pair. The transceiver pair can transmit information using a Light Emitting Diode (LED) and receive information using a light sensor, such as, a photo diode or a camera.

Optical Camera Communication (OCC) may be one of the forms of OWC. The OCC involves a camera that is used to decode information received from a transmitter. The transmitter transmits the information by encoding it in a spatially arranged color codes. Thus, while information transmission is based on emitting the encoded frames in color codes, reception is based on capturing the image of the transmitted information and extracting the spatial information which could be used to decode transmitted data.

The OCC may further include a screen based transmission scheme and an LED based transmission scheme. In a screen based transmission scheme, a set of color patterns may be used to encode information that is to be transmitted. As an example of spatially arranged coding scheme used in OCC, a Quick Response (QR) code based communication may be used that displays QR codes on a display screen. In the LED based transmission scheme, the information to be transmitted is encoded by color codes emitted by a set of spatially arranged LEDs. In the present state of art, when there are two or more transmission sources in the capture area of a receiver camera in an OCC network, the interference cause under this scenario may be mitigated using a coordinator which may assign a unique guard band to each of the two or more transmission sources. The conventional techniques require each of the two or more transmission sources to be registered with a single coordinator.

However, there may be a case where a rogue transmission source (a transmission source not registered with a coordinator and deliberately causing interference with the coordinated transmission sources, in order to degrade the quality of communication), may enter an OCC network. In such cases, communication with coordinated transmission sources may be disrupted. Conventional methods are ill-equipped to deal with such situations. Hence, interference management and multi-access in the interference region within the OCC systems remains a key challenge.

SUMMARY

In one embodiment, a method for identifying interference caused by a rogue transmission source in an Optical Camera Communication (OCC) network is disclosed. The method includes receiving, by an interference management device, information from a plurality of transmission sources. Each of the plurality of transmission sources is within a capture area of a camera. Each of the plurality of transmission sources includes a set of light sources configured to display one of a plurality of color codes. The method further includes detecting, by the interference management device, through the camera, an interference between a serving transmission source associated with the camera and a non-serving transmission source. The serving transmission source belongs to the plurality of transmission sources. The method further includes establishing, by the interference management device, the non-serving transmission source as the rogue transmission source, when the non-serving transmission source is not registered with a master coordinator within the OCC network.

In another embodiment, a method for mitigating interference by a rogue transmission source in an Optical Camera Communication (OCC) network is disclosed. The method includes detecting, by a camera-based receiver, interference caused by the rogue transmission source in a serving transmission source. The method further includes assigning, by the camera-based receiver, a first guard band to the serving transmission source. The first guard band is distinguishable from a second guard band associated with the rogue transmission source. The first guard band removes noise from transmission signals of the serving transmission source. The method further includes receiving, by the camera-based receiver, information from the serving transmission source based on the first guard band.

In another embodiment, an interference management device for identifying interference caused by a rogue transmission source in an Optical Camera Communication (OCC) network is disclosed. The interference management device includes a processor and a memory communicatively coupled to the processor. The memory stores processor instructions, which, on execution, cause the processor to receive information from a plurality of transmission sources. Each of the plurality of transmission sources is within a capture area of a camera. Each of the plurality of transmission sources includes a set of light sources configured to display one of a plurality of color codes. The processor instructions further cause the processor to detect, through the camera, an interference between a serving transmission source associated with the camera and a non-serving transmission source. The serving transmission source belongs to the plurality of transmission sources. The processor instructions further cause the processor to establish the non-serving transmission source as the rogue transmission source, when the non-serving transmission source is not registered with a master coordinator within the OCC network.

In yet another embodiment, a camera is disclosed. The camera includes a processor and a memory communicatively coupled to the processor, wherein the memory stores processor instructions, which, on execution, cause the processor to detect interference caused by the rogue transmission source in a serving transmission source. The processor instructions further cause the processor to assign a first guard band to the serving transmission source. The first guard band is distinguishable from a second guard band associated with the rogue transmission source. The first guard band removes noise from transmission signals of the serving transmission source. The processor instructions further cause the processor to receive information from the serving transmission source based on the first guard band.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
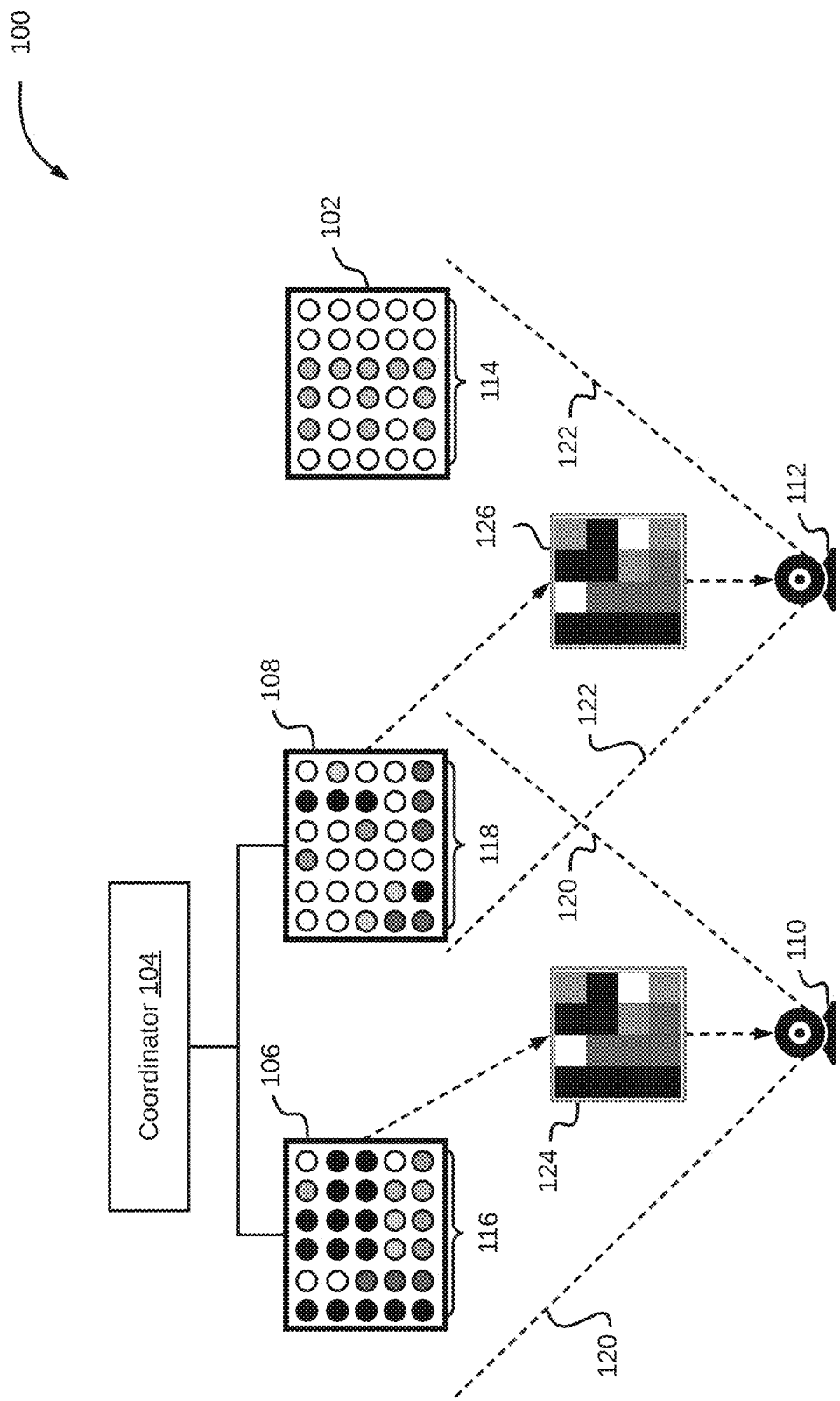
FIG. 1 illustrates an exemplary Optical Camera Communication (OCC) network where various embodiments may be employed.

In FIG. 1, an exemplary Optical Camera Communication (OCC) network 100 where various embodiments may be employed, is illustrated. The OCC network 100 may include a rogue transmission source 102 that may lead to interference in the OCC network 100. The rogue transmission source 102 is an access point. The OCC network 100 may include a coordinator 104 that may manage interference between a plurality of transmission sources (for example, a transmission source 106 and a transmission source 108), as experienced by a camera 110 (or a User Equipment (UE)). Each of the plurality of transmission sources is registered with the coordinator 104 and each of the plurality of transmission sources is an access point. It may be noted that the rogue transmission source 102 is not registered with the coordinator 104 and causes deliberate interference with coordinated transmission source (for example, the transmission source 108). It may be noted that a transmission source that is not registered with the coordinator 104 may also be termed as an uncoordinated transmission source, which may not be a rogue transmission source. The rogue transmission source 102 is distinct from an uncoordinated transmission source, in that, the rogue transmission source 102 is not registered with the coordinator 104 and deliberately causes interference to decrease overall throughput of the OCC network 100. Further, the rogue transmission source 102 may interfere with the transmission source 108, as experienced by a camera 112. As will be appreciated, each of the transmission source 106, the transmission source 108, and the rogue transmission source 102 may include a set of light sources for transmitting data signals in form of modulated light signals. By way of an example, the rogue transmission source 102 includes a set of light sources 114, the transmission source 106 includes a set of light sources 116, and the transmission source 108 includes a set of light sources 118.

Each of the set of light sources 114, 116, and 118 may be a matrix of Light Emitting Diode (LED) bulbs that are spatially arranged. Alternatively, the set of light sources 114, 116, and 118 may be a plurality of pixels. In this case, each of the transmission sources 106 and 108 and the rogue transmission source 102 may be display screens. Examples of display screens may include, but are not limited to LED screen, Liquid Crystal Display (LCD) screen, Organic LED (OLED) screen, or Active-Matrix OLED (AMOLED) screen. Thus, each light source within the set of light sources 114, 116, and 118 may be configured to display one of a plurality of color codes. As a result, a dot matrix formed by either the LED bulbs or pixels may create a pattern that may encode information which is required to be transmitted to the camera 110 and the camera 112. In both the implementations, i.e., the LED bulbs and the pixels, a unique pattern may be formed using one or more of on-off status and colors of pixels or LED bulbs.

By way of an example, an input data (which may be text, image, or video) that needs to be transmitted to the camera 110, may be represented using a Quick Response (QR) code by a transmission source (for example, the transmission source 106). In one scenario, the transmission source may be a display screen and the pixels may be used to display the QR code, as an example of spatially arranged coding scheme that is used in OCC network. In this case, the transmit area may either be dynamic or fixed. In other words, the QR code may either cover a portion of the display screen or the whole display screen, based on a current implementation. Further, in this scenario, a set of color patterns may be used to encode information that is required to be transmitted.

In another scenario, a transmission source may include an LED matrix (as depicted by the rogue transmission source 102 and the transmission sources 104 and 106) and the QR code may be a color pattern based QR code. In this case, the information to be transmitted may be encoded by color codes emitted by a set of spatially arranged LEDs in the LED matrix. A color emitted by each LED may carry a number of bits from the information to be transmitted. This may further vary based on the number of colors that may be decoded by the cameras 110 and 112. It will be apparent to a person skilled in the art that if more number of colors may be used to encode the information, overall throughput of the system 100 may increase.

The information encoded in a pattern displayed on the transmission source 106 is received and read by the camera 110, which acts as a receiver. Similarly, the camera 112 receives and reads information from the transmission source 108. A capture area 120 of the camera 110 and a capture area 122 of the camera 112 is depicted in FIG. 1. The camera 110 may take the snap of the free space between the transmission sources 106 and 108, and the camera 112 may take the snap of the free space between the transmission source 108 and the rogue transmission source 102. The camera 110 preserves the spatial information that may be used to decode the encoded information transmitted by one or more of the transmission sources 106 and 108. The information may be transmitted by the transmission sources 106 and 108 in the form of transmit frames. When a transmission source includes an LED matrix, for example, the transmission source 106, a transmit frame 124 may be transmitted. A receiver module (not shown in FIG. 1) within the camera 110 processes the transmit frame 124 captured by the camera 110 to decode the information thus transmitted by the transmission source 106. It will be apparent to a person skilled in the art that the receiver module may be located outside the camera 110. Similarly, the camera 112 receives a transmit frame 126 from the transmission source 108.

However, since the capture area 120 of the camera 110 covers both the transmission sources 106 and 108, at a given time, the camera 110 may receive transmit frames from both the transmission sources 106 and 108. This may lead to an interference experienced by the camera 110. The coordinator 104, which is in communication with the camera 110, may detect this interference. It will be apparent to a person skilled in the art that the coordinator 104 and the camera 110 may be located in separate devices. In order to mitigate and manage the interference thus detected, the coordinator 104 may assign different guard bands to each of the transmission sources 106 and 108. As a result, each transmit frame may have a unique guard band.

The coordinator 104 may additionally communicate the information regarding mapping of unique guard bands to respective transmission sources to the camera 110. The communication between the coordinator 104 and the camera 110 is explained in detail in conjunction with FIG. 2. By way of an example, the transmission source 106 may be allocated a guard band having red color, while the transmission source 108 may be allocated a guard band having blue color. As a result, when the camera 110 receives a transmit frame with a red guard band, the camera 110 is able to identify that the transmission source 106 has transmitted the transmit frame. Moreover, the camera 110 may be connected or attached to the transmission source 106. Thus, the camera 110 may accept the transmit frames transmitted by the transmission source 106 and may ignore the transmit frames transmitted by the transmission source 108. To this end, the camera 110 may accept transmit frames that have a red guard band and may reject/ignore transmit frames that have a blue guard band. As a result of the guard bands, the camera 110 is able to eliminate noise.

However, the capture area 122 of the camera 112 covers the transmission source 108 and the rogue transmission source 102. The rogue transmission source 102 is not registered with the coordinator 104 or any other coordinator for that matter. In such embodiments, the coordinator 104 may fail to mitigate the interference experienced by the camera 112, and data transmission may be affected.

Figure 2:
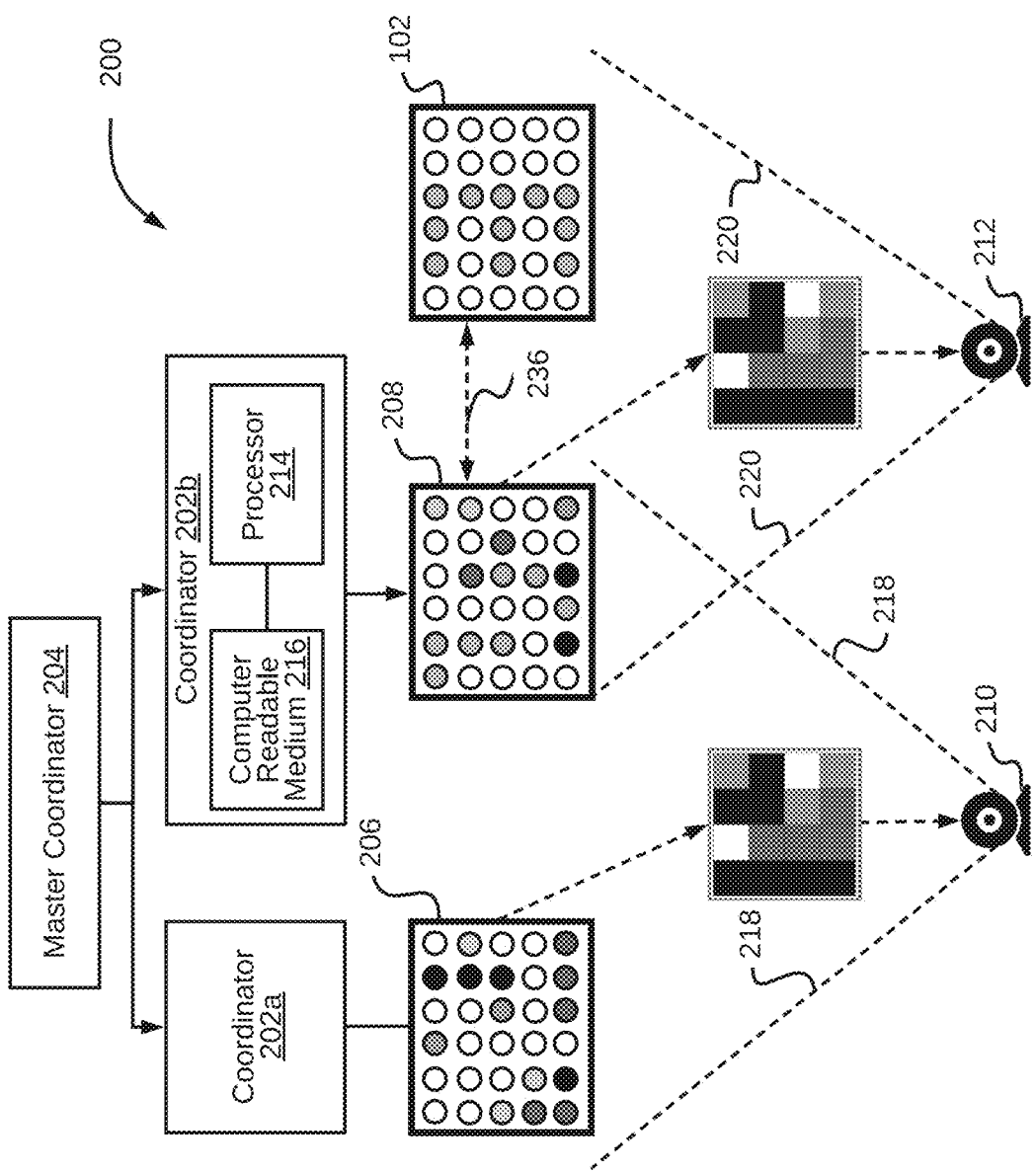
FIG. 2 is a block diagram of a system for identifying and mitigating interference caused by a rogue transmission source in an OCC network, in accordance with some embodiments.

Referring now to FIG. 2, a block diagram of a system 200 for identifying and mitigating interference caused by a rogue transmission source 102 in an OCC network is illustrated, in accordance with some embodiments. The system 200 includes a coordinator 202a, a coordinator 202b, and a master coordinator 204. The master coordinator 204 manages the coordinators 202a and 202b. The coordinator 202a may be connected to a transmission source 206 and the coordinator 202b may be connected to a transmission source 208. The system 200 further includes a camera 210 and a camera 212 receiving corresponding transmit frames from the transmission source 206 and the transmission source 208, respectively. As will be appreciated, each of the transmission sources 206 and 208, and the rogue transmission source 102 may include a set of light sources for transmitting data signals in form of modulated light signals.

Further, each of the coordinators 202a and 202b may include a processor 214 and a computer readable medium 216 for storing processor-executable instructions. For ease of explanation, only the coordinator 202b is depicted as including the processor 214 and the computer readable medium 216. The computer readable medium 216 may store instructions that, when executed by the processor 214, may cause the processor 214 to identify and mitigate interference caused by the rogue transmission source 102 in an OCC network, in accordance with various embodiments. The computer readable medium 216 may also store various data (for example, unique guard band of the transmission source 208, information of each of a plurality of cameras 210 and 212 in vicinity of the transmission source 208, or the like) that may be captured, processed, and/or required by the coordinator 202b. Further, the computer readable medium 216 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

The coordinator 202b may interact with the transmission source 208 for sending or receiving various data. The coordinator 202b may also interact with the plurality of cameras 210 and 212 for receiving various data, via, the transmission source 208. It should be noted that a plurality of transmission sources may be registered with a single coordinator. It may further be noted that the master coordinator 204 may also include a processor and a computer readable medium (not shown in FIG. 2). In an embodiment, a capture area 218 of the camera 210 may cover both the transmission sources 206 and 208. The camera 210 may receive transmit frames from both the transmission sources 206 and 208 simultaneously leading to an interference experienced by the camera 210. It may be noted that the transmission source 208 is controlled by the coordinator 202b and the transmission source 206 is controlled by the coordinator 202a. In such an embodiment, the master coordinator 204 may identify and mitigate the interference experienced by the camera 210. In yet another embodiment, a capture area 220 of the camera 212 may cover both the rogue transmission source 102 and the transmission source 208. As has been discussed in conjunction with FIG. 1, the rogue Li-Fi access point 102 is not registered with the coordinator 202b, the coordinator 202a or with any other coordinator in the exemplary OCC network. In such an embodiment, at least one of the coordinator 202b and the master coordinator 204 may assign a first guard band to the transmission source 208.

It may be noted that the first guard band is distinguishable from a second guard band of the rogue transmission source 102. The transmit frames received through the first guard band of the transmission source 208 may be identified by the camera 212, and the interference caused by the rogue transmission source 102 may then be mitigated. An interference experienced by the camera 212 may be mitigated through the master coordinator 204. The master coordinator 204 may receive interference information from each of the coordinator 202a and the coordinator 202b. Moreover, some embodiments disclose a method of detecting whether an interfering transmission source is coordinated or not.

Figure 3:
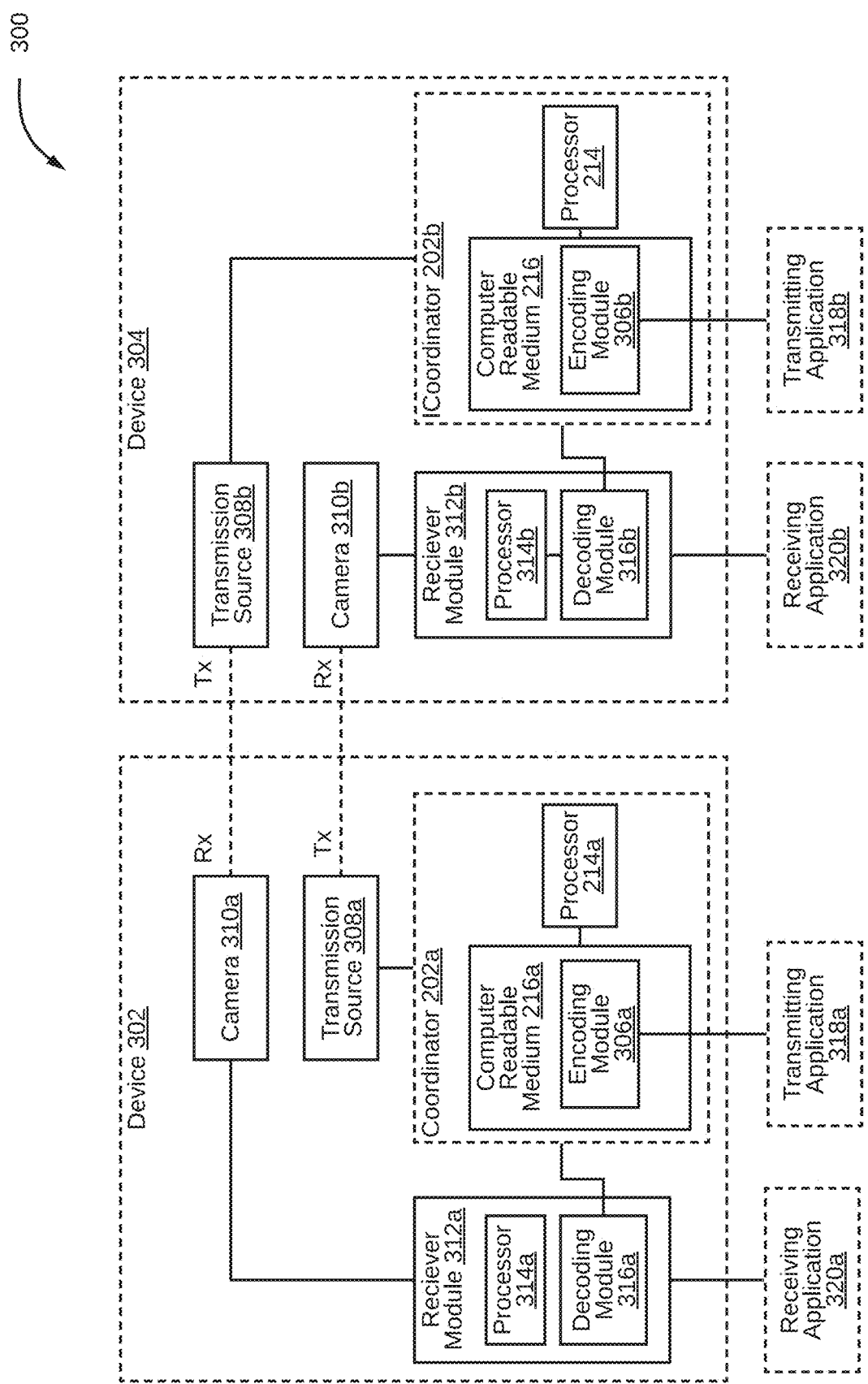
FIG. 3 is a functional block diagram of a system for identifying and mitigating interference between transmission sources within a first device and a second device, in accordance with some embodiments.

Referring now to FIG. 3, a functional block diagram of a system 300 for identifying and mitigating interference between transmission sources within a device 302 and a device 304 in an OCC network is illustrated, in accordance with some embodiments. Examples of each of the devices 302 and 304 may include any computing device that includes a camera and a transmission source (for example, one of the transmission sources 206 and 208). The device 302 includes a computer readable medium 216a (analogous to the computer readable medium 216) that is communicatively coupled to a processor 214a (analogous to the processor 214). The computer readable medium 216a further includes an encoding module 306a. As is apparent from the FIG. 2, the computer readable medium 216a and the processor 214a may be present inside a coordinator 202a. Alternatively, the computer readable medium 216a and the processor 214a may be located within any device of the OCC network. The coordinator 202a is further communicatively coupled to a transmission source 308a which may be analogous to one of the transmission sources 206 or 208. The device 302 may further include a camera 310a, which may be analogous to the cameras 210 or 212. The camera 310a may further be communicatively coupled to a receiver module 312a. Though the receiver module 312a is depicted as being present outside the camera 310a, the receiver module 312a may be located within the camera 310a in some embodiments. The receiver module 312a further includes a processor 314a and a decoding module 316a.

In a similar manner, the device 304 includes a computer readable medium 216 that is communicatively coupled to a processor 214. The computer readable medium 216 further includes an encoding module 306b. As is apparent from the FIG. 3, the computer readable medium 216 and the processor 214 may be present inside a coordinator 202b. Alternatively, the computer readable medium 216 and the processor 214 may be located within any device of the OCC network. The coordinator 202b is further communicatively coupled to a transmission source 308b, which may be analogous to one of the transmission sources 206 or 208. The device 304 may further include a camera 310b, which may be analogous to the cameras 210 or 212. The camera 310b may further be communicatively coupled to a receiver module 312b. Though the receiver module 312b is depicted as being present outside the camera 310b, the receiver module 312b may be located within the camera 310b in some embodiments. The receiver module 312b further includes a processor 314b and a decoding module 316b.

In the system 300, the camera 310a and the transmission source 308b form a first transceiver pair, while the camera 310b and the transmission source 308a form a second transceiver pair. In other words, information transmitted by the transmission source 308b is received and decoded by the camera 310a in conjunction with the receiver module 312a. In a similar manner, information transmitted by the transmission source 308a is received and decoded by the camera 310b in conjunction with the receiver module 312b.

By way of an example, a transmitting application 318b, which is communicatively coupled to the encoding module 306b, may want to transmit data to a receiving application 320a that is communicatively coupled to the camera 310a through the receiver module 312a. To this end, the transmitting application 318b shares the data with the encoding module 306b, which encodes the data to be transmitted based on a predetermined encoding pattern and the type of the transmission source 308b (i.e., a screen based transmission or an LED based transmission). The encoding module 306b then shares the encoded data with the coordinator 202b, which further communicates the encoded data to the transmission source 308b. The transmission source 308b then transmits the encoded data to the camera 310a. Methods of transmitting data from a transmission source to a camera have been explained in detail in conjunction with FIG. 1.

Once the camera 310a receives the encoded data as transmit frames, the decoding module 316a in the receiver module 312a decodes the encoded data to extract the information. The information is then shared with the receiving application 320a. Additionally, using a closed feedback loop, the decoding module 316a shares the decoded information with the coordinator 202a. Based on the decoded information, the coordinator 202a may determine whether the camera 310a is experiencing interference, as a result of multiple transmission sources within its capture area. The detection of interference may be communicated to the device 304, through the second transceiver pair, i.e., the transmission source 308a and the camera 310b. The decoding module 316b may share information associated with interference detection with the coordinator 202b, which may then manage the interference by assigning unique guard bands. This is further explained in detail in conjunction with FIG. 4 and FIG. 5.

By way of another example, a transmitting application 318a, which is communicatively coupled to the encoding module 306a, may want to transmit data to a receiving application 320b that is communicatively coupled to the camera 310b through the receiver module 312b. A similar mechanism as detailed in the example above is followed in this case as well.

Figure 4:
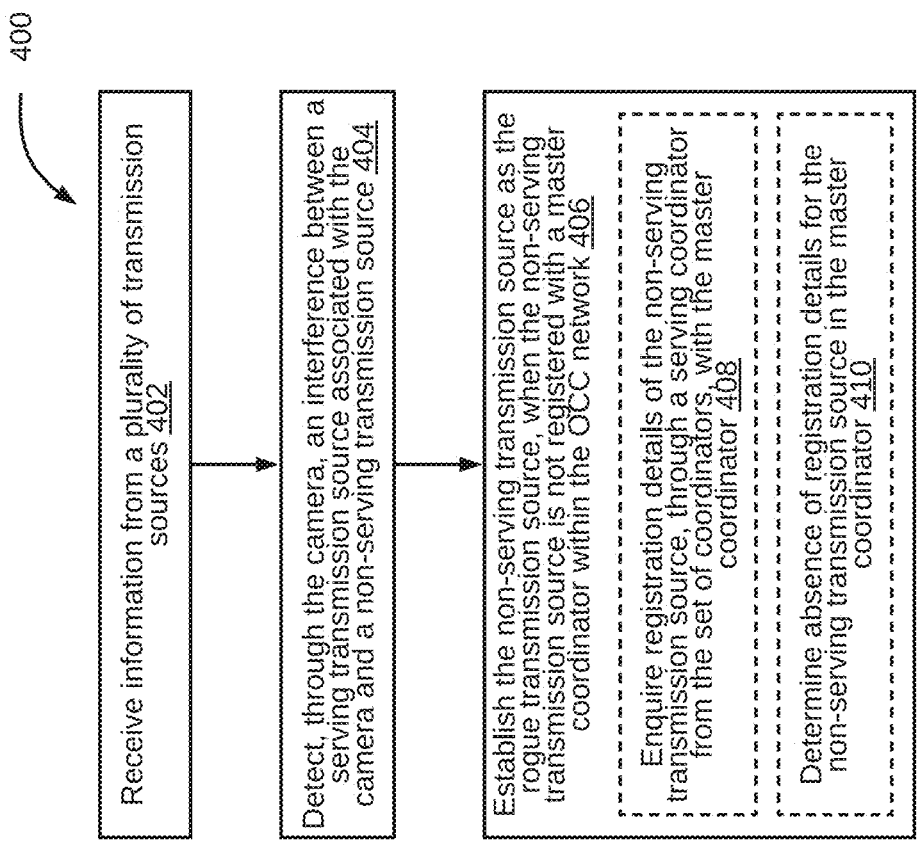
FIG. 4 is a flow diagram of an exemplary control logic for identifying interference caused by a rogue transmission source in an OCC network, in accordance with some embodiments.

Referring now to FIG. 4, an exemplary control logic 400 for identifying interference caused by a rogue transmission source 102 in an OCC network is illustrated via a flow chart, in accordance with some embodiments. At step 402, an interference management may receive information from a plurality of transmission sources. The interference management device may be a coordinator (for example, the coordinator 202b) or the master controller 204. Alternatively, the interference management device may be an independent device that is in communication with the coordinator or the master controller 204. It may be noted that the plurality of transmission sources is within a capture area of a camera. It may also be noted that each of the plurality of transmission sources includes a set of light sources configured to display one of a plurality of color codes. The control logic 400 may further include detecting, by the interference management device, through the camera, an interference between a serving transmission source associated with the camera and a non-serving transmission source, at step 404. The serving transmission source belongs to the plurality of transmission sources. It may be noted that the plurality of transmission sources are registered, through a set of coordinators, with the master coordinator 204 within the OCC network. The control logic 400 may further include establishing, by the interference management device, at step 406, the non-serving transmission source as the rogue transmission source 102, when the non-serving transmission source is not registered with the master coordinator 204 within the OCC network.

In some embodiments, the step 406 of the control logic 400 may further include enquiring registration details of the non-serving transmission source, through a serving coordinator from the set of coordinators, with the master coordinator 204, at step 408. Further, the step 406 of the control logic 400 may include determining absence of registration details for the non-serving transmission source in the master coordinator 204, at step 410.

Figure 5:
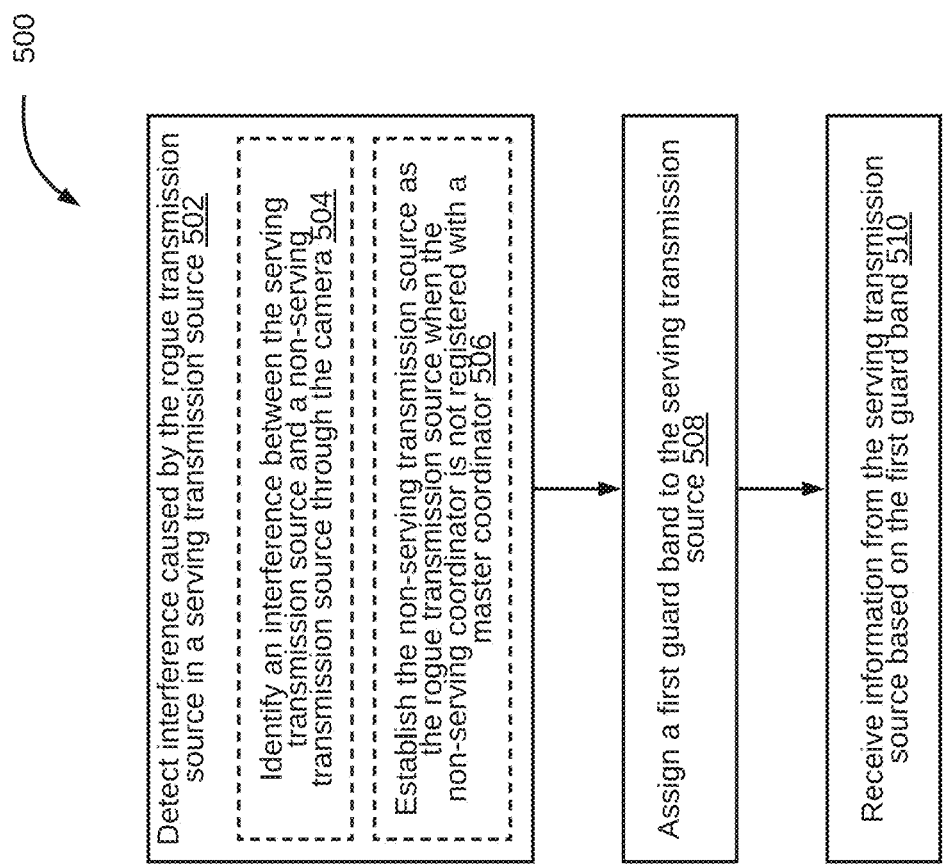
FIG. 5 is a flow diagram of an exemplary control logic for mitigating interference caused by a rogue transmission source, in accordance with some embodiments.

Referring now to FIG. 5, an exemplary control logic 500 for mitigating interference caused by a rogue transmission source 102 is illustrated via a flow chart, in accordance with some embodiments. As illustrated in the flowchart, the control logic 500 may include detecting, by a camera (for example, camera 212), interference caused by the rogue transmission source 102 in a serving transmission source (for example, transmission source 208), at step 502. In an embodiment, the coordinator 202b may receive the interference information from the camera 212. Each of the rogue transmission source 102 and the serving transmission source is within a capture area of the camera 212. Further, each of the rogue transmission source 102 and the serving transmission source may include a set of light sources that are configured to display one of a plurality of color codes. By way of an example, the rogue transmission source 102 includes the set of light sources 114. This has been already been explained in detail in conjunction with FIG. 1.

In some embodiments, the step 502 of the control logic 500 may further include identifying an interference between the serving transmission source and a non-serving transmission source through the camera, at step 504. Further, the step 502 of the control logic 500 may include establishing the non-serving transmission source as the rogue transmission source 102 when the non-serving coordinator is not registered with the master coordinator 204, at step 506. It may be noted that the master coordinator 204 manages a set of coordinators (for example, coordinators 202a and 202b). Each of the set of coordinators manages a set of transmission sources from a plurality of transmission sources. By way of an example, the coordinator 202a manages the transmission source 206 and the coordinator 202b manages the transmission source 208.

The control logic 500 may further include assigning, by the camera, a first guard band to the serving transmission source, at step 508. It may be noted that the first guard band is distinguishable from a second guard band associated with the rogue transmission source 102. It may also be noted that the first guard band removes noise from transmission signals of the serving transmission source. The first guard band assigned to the serving transmission source corresponds to an Identifier (ID) for the serving transmission source and the second guard band associated with the rogue transmission source 102 corresponds to an Identifier (ID) for the rogue transmission source 102. By way of an example, when a guard band for the rogue transmission source 102 is detected as a blue guard band, then, for the transmission source 208, the coordinator 202b may assign a red guard band to the transmission source 208. The camera (for example, the camera 212) is configured as the receiver of the serving transmission source (for example, the transmission source 208). In other words, the camera is communicatively coupled to the serving transmission source, as explained in detail in conjunction with FIG. 3.

The control logic 500 may further include receiving, by the camera, information from the serving transmission source based on the first guard band, at step 510. By way of an example, the coordinator 202b may share with the camera 212 that a red guard band has been assigned to the transmission source 208. Further, the coordinator 202b may instruct the camera 212 to accept transmit frames that have a red guard band and to drop transmit frames that have a blue guard band. The communication between the coordinator 202b and the camera 212 with regards to the guard bands may be in conformance with the communication mechanism explained in FIG. 3.

Referring back to FIG. 2, the system 200 may identify, through the camera 212, a location of the rogue transmission source 102 based on a distance 236 between the rogue transmission source 102 and the serving transmission source (for example, the transmission source 208). In an embodiment, the distance 236 may be in pixels. The distance 236 or the location of the rogue transmission source 102 may be then sent to the coordinator 202b or the master coordinator 204. Further, the coordinator 202b or the master coordinator 204 may provide the location of the rogue transmission source 102 to law enforcement agencies for subsequent removal of the rogue transmission source 102.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for interference detection due to rogue transmission sources in a capture area, using the help of receiver camera. The various embodiments also provide for interference mitigation using guard bands in order to overcome interference due to rogue transmission sources. Further, the various embodiments provide for interference mitigation between transmission sources registered with different coordinators, through a master coordinator which controls each of the different coordinators. Moreover, the various embodiments provide for geolocating the rogue transmission sources based on the distance between each of the rogue transmission sources and at least one transmission source registered with a coordinator.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying interference caused by a rogue transmission source in an Optical Camera Communication (OCC) network, the method comprising:
   receiving, by an interference management device, information from a plurality of transmission sources, wherein each of the plurality of transmission sources is within a capture area of a camera, and wherein each of the plurality of transmission sources comprises a set of light sources configured to display one of a plurality of color codes;
   detecting, by the interference management device, through the camera, an interference between a serving transmission source associated with the camera and a non-serving transmission source, wherein the serving transmission source belongs to the plurality of transmission sources; and
   establishing, by the interference management device, the non-serving transmission source as the rogue transmission source, when the non-serving transmission source is not registered with a master coordinator within the OCC network.

2. The method of claim 1, further comprising registering the plurality of transmission sources through a set of coordinators, with the master coordinator within the OCC network.

3. The method of claim 2, wherein the master coordinator manages the set of coordinators, and wherein each of the set of coordinators manages a set of transmission sources from the plurality of transmission sources.

4. The method of claim 3, wherein the non-serving transmission source is not registered with each of the set of coordinators.

5. The method claim 4, wherein establishing the non-serving transmission source as the rogue transmission source comprises:
   enquiring registration details of the non-serving transmission source, through a serving coordinator from the set of coordinators, with the master coordinator; and
   determining absence of registration details for the non-serving transmission source in the master coordinator.

6. The method of claim 2, further comprising identifying, through the camera, a location of the rogue transmission source based on a distance between the rogue transmission source and the serving transmission source, wherein the distance is in pixels.

7. A method for mitigating interference by a rogue transmission source in an Optical Camera Communication (OCC) network, the method comprising:
   detecting, by a camera, interference caused by the rogue transmission source to a serving transmission source;
   assigning, by the camera, a first guard band to the serving transmission source, wherein the first guard band is distinguishable from a second guard band associated with the rogue transmission source, and wherein the first guard band removes noise from transmission signals of the serving transmission source; and
   receiving, by the camera, information from the serving transmission source based on the first guard band.

8. The method of claim 7, wherein detecting interference caused by the rogue transmission source further comprises:
   identifying an interference between the serving transmission source and a non-serving transmission source through the camera; and
   establishing the non-serving transmission source as the rogue transmission source when the non-serving coordinator is not registered with a master coordinator.

9. The method of claim 8, wherein the master coordinator manages a set of coordinators, and wherein each of the set of coordinators manages a set of transmission sources from a plurality of transmission sources.

10. The method of claim 7, wherein:
    the first guard band assigned to the serving transmission source corresponds to an Identifier (ID) for the serving transmission source; and
    the second guard band associated with the rogue transmission source corresponds to an Identifier (ID) for the rogue transmission source.

11. An interference management device for identifying interference caused by a rogue transmission source in an Optical Camera Communication (OCC) network, the interference management device comprising:
    a processor;
    a computer readable medium comprising processor instructions, which when executed by the processor, cause the processor to:
       receive information from a plurality of transmission sources, wherein each of the plurality of transmission sources is within a capture area of a camera, and wherein each of the plurality of transmission sources comprises a set of light sources configured to display one of a plurality of color codes;
       detect, through the camera, an interference between a serving transmission source associated with the camera and a non-serving transmission source, wherein the serving transmission source belongs to the plurality of transmission sources; and
       establish the non-serving transmission source as the rogue transmission source, when the non-serving transmission source is not registered with a master coordinator within the OCC network.

12. The interference management device of claim 11, wherein the processor instructions further cause the processor to register the plurality of transmission sources through a set of coordinators, with the master coordinator within the OCC network.

13. The interference management device of claim 12, wherein the master coordinator manages the set of coordinators, and wherein each of the set of coordinators manages a set of transmission sources from the plurality of transmission sources.

14. The interference management device of claim 13, wherein the non-serving transmission source is not registered with each of the set of coordinators.

15. The interference management device of claim 14, wherein to establish the non-serving transmission source as the rogue transmission source, the processor instructions further cause the processor to:
    enquire registration details of the non-serving transmission source, through a serving coordinator from the set of coordinators, with the master coordinator; and
    determine absence of registration details for the non-serving transmission source in the master coordinator.

16. The interference management device of claim 12, wherein the processor instructions further cause the processor to identify, through the camera, a location of the rogue transmission source based on a distance between the rogue transmission source and the serving transmission source, wherein the distance is in pixels.

17. A camera comprising:
a processor; and
a memory communicatively coupled to the processor, wherein the memory stores processor instructions, which, on execution, causes the processor to:
 detect interference caused by the rogue transmission source to a serving transmission source;
 assign a first guard band to the serving transmission source, wherein the first guard band is distinguishable from a second guard band associated with the rogue transmission source, and wherein the first guard band removes noise from transmission signals of the serving transmission source; and
 receive information from the serving transmission source based on the first guard band.

18. The camera of claim 17, wherein to detect interference caused by the rogue transmission source, the processor instructions further cause the processor to:
 identify an interference between the serving transmission source and a non-serving transmission source through the camera; and
 establish the non-serving transmission source as the rogue transmission source when the non-serving coordinator is not registered with a master coordinator.

19. The camera of claim 18, wherein the master coordinator manages a set of coordinators, and wherein each of the set of coordinators manages a set of transmission sources from a plurality of transmission sources.

20. The camera of claim 17, wherein:
the first guard band assigned to the serving transmission source corresponds to an Identifier (ID) for the serving transmission source; and
the second guard band associated with the rogue transmission source corresponds to an Identifier (ID) for the rogue transmission source.

\* \* \* \* \*